United States Patent [19]

Oudet et al.

[11] Patent Number: 5,521,451
[45] Date of Patent: May 28, 1996

[54] LOW-COST STEPPING OR SYNCHRONOUS MOTOR

[75] Inventors: Claude Oudet, Besancon; Daniel Prudham, Thise, both of France

[73] Assignee: Moving Magnet Technologies S.A., Besancon, France

[21] Appl. No.: 157,022

[22] PCT Filed: Jun. 4, 1992

[86] PCT No.: PCT/FR92/00496

§ 371 Date: Oct. 5, 1994

§ 102(e) Date: Oct. 5, 1994

[87] PCT Pub. No.: WO92/22122

PCT Pub. Date: Dec. 10, 1992

[30] Foreign Application Priority Data

Jun. 6, 1991 [FR] France ................... 91 06845

[51] Int. Cl.⁶ .................. H02K 1/22; H02K 1/27; H02K 37/16; H02K 21/18
[52] U.S. Cl. .................. 310/266; 310/49 R; 310/162; 310/156
[58] Field of Search .................. 310/49 R, 162, 310/266, 156

[56] References Cited

U.S. PATENT DOCUMENTS

| | | | |
|---|---|---|---|
| 1,836,513 | 12/1931 | Spengler | 310/156 |
| 2,627,040 | 1/1953 | Hansen | 310/49 R |
| 3,356,876 | 12/1967 | Scholten | 310/156 |
| 3,391,289 | 7/1968 | Danilewicz et al. | 310/49 R |
| 3,519,859 | 7/1970 | Morreale et al. | 310/49 R |
| 3,693,034 | 9/1972 | Inariba | 310/49 R |
| 3,860,842 | 1/1975 | Schwab et al. | 310/49 R |
| 3,864,588 | 2/1975 | Inaba | 310/266 |
| 3,979,616 | 9/1976 | Stechmann | 310/49 R |
| 4,070,592 | 1/1978 | Snowdon et al. | 310/49 R |
| 4,782,353 | 11/1988 | Ogihara et al. | 310/49 R |

FOREIGN PATENT DOCUMENTS

| | | | |
|---|---|---|---|
| 1457327 | 9/1966 | France . | |
| 1-47256 | 2/1989 | Japan | 310/49 R |
| 2-228241 | 9/1990 | Japan | 310/49 R |
| 417879 | 7/1974 | U.S.S.R. | 310/49 R |

*Primary Examiner*—Clayton E. LaBalle
*Attorney, Agent, or Firm*—Oblon, Spivak, McClelland, Maier & Neustadt

[57] ABSTRACT

The present invention concerns a two-phase, stepping or synchronous motor. The rotor (6) includes five pairs of poles and the stator consists of two identical stator components (1,2) made from a low retentivity material, each having two stator poles (19,20) and (21,22) linked by a median part (23,24) surrounded by a winding (3,4) of a length substantially equal to the width of the opening of the stator component (1,2), the median lines (25 to 28) of said stator poles (19 to 22) being spaced apart by approximately 108°. The second stator part (5) is composed of a low retentivity material for closing the magnetic circuit.

11 Claims, 2 Drawing Sheets

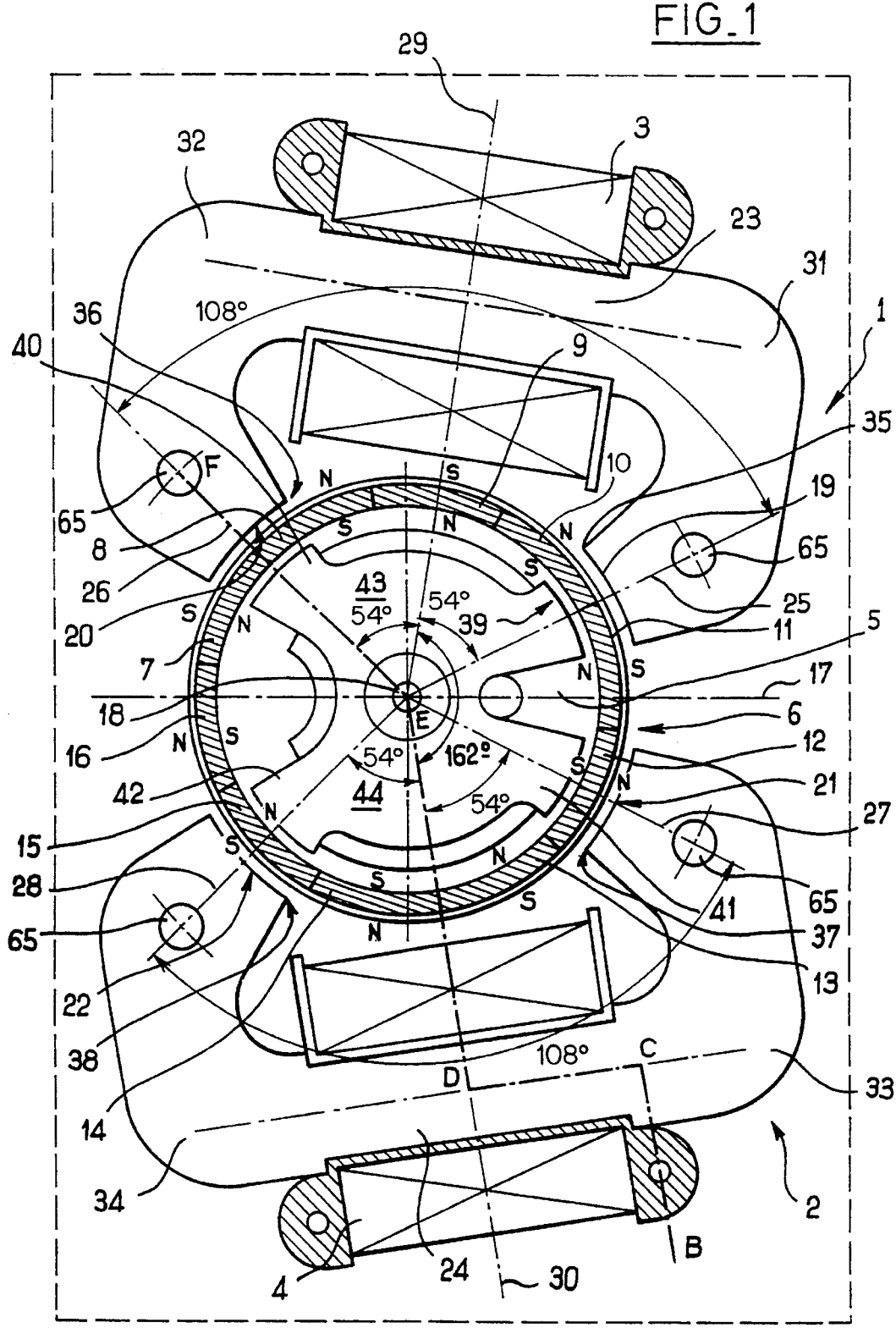

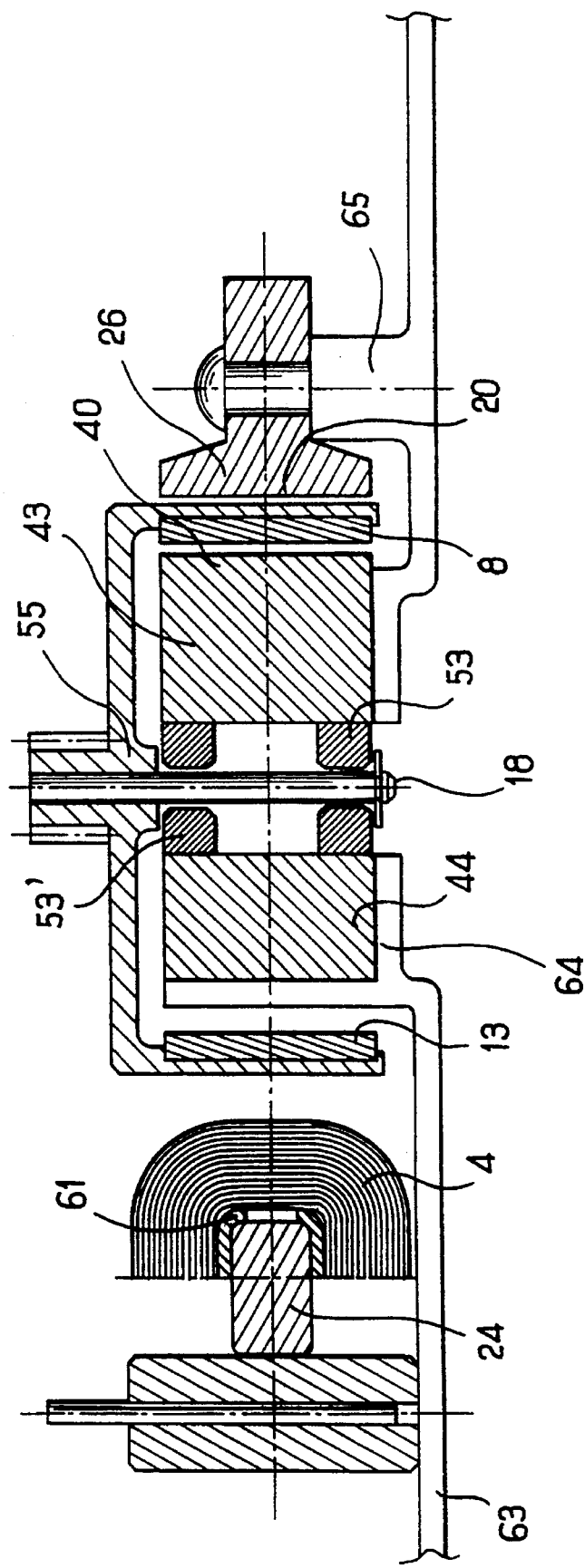
FIG_2

LOW-COST STEPPING OR SYNCHRONOUS MOTOR

The present invention concerns a pulsed or synchronous two-phased motor comprising a rotor which incorporates thin permanent magnets having staggered poles. This type of motor further comprises several starer poles, which must be energized independently using at least two current sources related in phase, so as to cause the rotor to rotate in one direction or the other. These motors are used in many fields, and in particular in office equipment, such as printers, fax machines, photocopiers, and household appliances. In many other fields, a growing number of machines are motorized. Accordingly, motorized controls are becoming more numerous in automobiles, e.g., seat controls, heat-adjustment panels, and directional headlight settings. In consequence, increasingly stringent requirements regarding manufacturing cost-reduction of these two-phase pulsed or synchronous motors are encountered. Moreover, motors known conventionally according to prior art are normally separate components which work in conjunction with apparatuses designed independently, by means of linkage and coupling devices.

More specifically, with respect to automatic temperature control in an automobile, use is made according to prior art of automatic position control utilizing a direct-current motor incorporating a manifold, which controls the air panel by means of a train of speed-reducing gears. To allow digital control, the direct current motor is replaced by a pulsed motor. This substitution further involves the replacement of the coupling devices and often requires the integral design of the panel controls. The new motor is normally purchased from a subcontractor, which delivers a standard unit which has been assembled and tested and which incorporates, in addition to the rotor and stator, bearings and a housing and whose space requirement is not always suited to the mechanism to be controlled.

SUMMARY OF THE INVENTION

The purpose of the present invention is to provide a synchronous or pulsed motor capable of being incorporated into the rest of the mechanism it controls. The motor according to the invention may, consequently, be delivered as separate components which can be assembled between two mechanism plates which, moreover, support the transmission controlling, for example, an air-conditioning panel. This type of assembly is facilitated by virtue of the fact that the motor according to the invention is a single-stage motor. The cost price of the motor according to the invention is held to a minimum because of the specification of the components, whose manufacture is economically advantageous, and because of the optimal design of the configuration of the various parts of the rotor and stator and of their assembly. In particular, the weight of the iron and copper used in the motor according to the invention is lower than in competing solutions giving identical torque and number of pitches per rotation.

The motor according to the invention comprises a first stator part working in conjunction with at least two electric coils; a second stator component which ensures at least the partial closing of the magnetic fluxes; and a rotor incorporating 2N thin magnets magnetized transversely in alternating directions, so as to create on each of its surfaces magnetic poles which are alternatively positive and negative. On each of its surfaces, the rotor comprises five pairs of poles, and the first stator component is formed from two identical stator parts possessing high magnetic permeability, each of which has two stator poles joined by a median part enclosed by a coil whose length is substantially equal to the width of the opening of the stator part.

The axis of the coils is arranged substantially in the middle plane of the magnet and of the stator components made of a soft material, which is perpendicular to the axis of rotation. Each wound stator part, along with the area of the second stator part closing off the flow, constitutes one phase of the stator of the two-phase motor. The median lines of the two poles are spaced apart by approximately 1.5 pitches. The second stator part is formed from a material possessing high magnetic permeability and four areas corresponding, respectively, to the four stator poles, said four areas being connected in pairs so as to ensure the closing off of the magnetic flux from each of the stator parts. The choice of five pairs of poles proves particularly advantageous, since it equals the minimum number of poles compatible with a flat two-phase, single-stage structure in which each element of the stator structure can be made from a single or laminated part, by cutting said part from a soft, magnetically-permeable material, and which further makes possible a winding incorporating regular turns.

In fact, in the case of a structure comprising a number of upper poles, e.g., six, one of two possibilities exists: either, for a motor comprising poles of constant width, one pair of poles would not be used and would thus give a more expensive rotor possessing a greater moment of inertia; or else, for a motor whose rotor diameter is uniform, the torque would be reduced.

The motor according to the invention is, by virtue of its structure, particularly well suited to modem powerful, economical magnets made of neodymium-iron and compression- or injection-molded.

The invention concerns a first variant of a two-phase pulsed or synchronous motor, whose rotor consists of a disk magnetized transversely and comprises two areas whose magnetization is positive and negative in alternating fashion. Said areas are shaped as 36-degree angled sectors magnetized perpendicularly to the surface of the disk in alternating directions. This embodiment proves advantageous in the event that the vertical space requirement must be reduced to the minimum.

In a preferred variant, the invention relates to a two-phase pulsed or synchronous motor whose rotor is formed by a ring-shaped magnet magnetized radially and incorporates ten areas whose magnetization is positive and negative in alternating fashion. Each of these areas is tile-shaped and has an angled opening of approximately 36 degrees. This embodiment is preferred because it facilitates reduction of the axial and radial interference stresses on the rotor axis caused by magnetic activity, which is imperfectly balanced because of manufacturing tolerances.

The angled aperture of the mean perpendiculars of the two poles of each of the polar parts is slightly greater than 108°. This embodiment makes it possible to reduce the residual torque to 20 periods per revolution in the absence of current, and, secondarily, to increase the length of winding capable of being wound simply.

According to a special embodiment, the stator parts are made from a stack of magnetic sheets preferably cut from iron-silicon having a thickness of approximately 0.5 millimeter. This embodiment makes it possible to produce stator structures whose thickness is governed by no restrictions.

According to a variant embodiment of the windings, the coils consist of an electric wire wound directly on the median part of the stator part. Although, in this case, the first layer of turns is short-circuited, this solution proves advantageous because of the lack of a frame and insulating layer, an arrangement which simplifies the manufacturing process and reduces costs.

According to another variant, the windings are wound around insulating frames surrounding the median part of each of the stator components, said frame consisting either of a single molded, slotted part, or of several complementary parts forming an insulating sleeve when assembled.

Advantageously, the rotor is formed from a tubular sleeve coaxial with the axis of rotation and fitted with zones of connection to the axis of rotation, said tubular sleeve supporting the tubular magnet over at least a portion of its height.

The stator parts are positioned and attached to the plate-support, which incorporates complementary recesses and pins capable of receiving and holding in place said stator parts. This plate may consist of a printed circuit.

According to another preferred variant, the second stator is stationary and toothed. This embodiment makes it possible, on the one hand, to reduce the inertia of the rotor, and, on the other, to increase the torque by virtue of a set of teeth on each side of the thin magnet. These characteristics are advantageous in applications in which higher accelerations are sought. Furthermore, it is thus possible to get around the lack of compatibility between the respective coefficients of expansion of a part made of iron and of a molded magnet.

Whatever the embodiment mentioned above, i.e., disk- or cylinder-shaped rotor, a first variant of the invention consists in the fact that the second stator component is attached to the rotor. This embodiment makes it possible to produce a rotor possessing a high degree of stiffness and, therefore, considerable mechanical strength, a feature which proves advantageous in the manufacture of a highly-reliable two-phase pulsed or synchronous motor.

BRIEF DESCRIPTION OF THE DRAWINGS

The present invention will be better understood from a reading of the following description provided with reference to the attached drawings, in which:

FIG. 1 is a transverse cross-section;

FIG. 2 is a cross-section along the lines BCDEF.

DETAILED DESCRIPTION OF THE PREFERRED EMBODIMENTS

The pulsed motor according to the example described comprises a stator structure and a rotor. The stator structure comprises a first stator component formed from two stator parts 1, 2, each of which is magnetically coupled to a respective coil 3, 4, and from a second stator component 5 arranged inside the tubular rotor 6.

The hard magnetic part of the rotor has ten tile-shaped portions 7 to 16 magnetized radially in alternating directions, so as to present, in alternating fashion, a SOUTH pole on the inner surface and a SOUTH pole on the outer surface of the rotor. Each of the magnetized portions occupies an angled sector of 36°. The cylindrical rotor magnet may be produced by combining separate magnetized parts, or by magnetizing the various zones of a ring preferably made by molding, compression, or injection, into an alloy having a high coercive field, of plastic neodymium-iron having a substantially linear B(H) characteristic in the second quadrant, e.g., magnets marketed under the name "NP8L" (a bonded magnet comprising neodymium magnetic powder and a plastic resin binder) by the Daido Steel Corporation and manufactured from powder marketed by General Motors Corporation and designated as "MQI"(a bonded magnet comprising neodymium magnetic powder and a plastic resin binder). Use may also be made of a radially-oriented material, such as that marketed under the name "SAMLET 9R" (a bonded magnet comprising samarium magnetic powder and a plastic resin binder) by the Epson Company.

The two stator parts 1, 2 making up the first stator element are symmetrical in relation to a median plane 17 of the motor containing the axis of rotation 18 of the rotor. Each of the stator parts 1,2 is symmetrical in relation to a plane 29 and 30, respectively, forming together an angle of 162°, that is, 81° in relation to the plane of symmetry 17 of the motor. Each of the stator parts 1,2 has two stator poles, 19, 20 and 21, 22, respectively, connected by a median part 23 and 24, respectively. The width of a stator pole is substantially less than the width of one magnetized area 7 to 16, and approaches 28°. It has a concave surface whose radius is slightly greater than the outer radius of the rotor. The height of each of the stator poles 19 to 22 equals the height of the magnetized portion of the rotor 6. The angular gap between the axes of symmetry 25, 26 and 27, 28 for each of the stator poles 19, 20 and 21, 22, respectively, is 108°+$\beta$, where $\beta$ is a null angle if no compensation for magnetostatic torque is sought (in the absence of current), or substantially 9° if compensation for the harmonic of 4 to 20 periods per revolution is desired. The harmonic of 2 to 10 periods per revolution is automatically counterbalanced by the existence of two phases in electric quadrature.

The two stator parts 1,2 according to the example described are sintered from a soft magnetic material. The median parts 23, 24, which has a rectangular section, are extended on each side by curved portions 31 to 34, whose ends form the stator poles 19 to 22. The manufacture of each of the stator parts 1 and 2 in one piece proves especially advantageous, since it makes it possible to avoid any magnetic joint in the direction of propagation of the flux.

Each of the stator parts 1, 2 supports, and is coupled magnetically to, a winding 3 and 4, respectively. These windings are wound directly on the stator parts in order to reduce the number of motor components and to simplify the manufacturing process. A shore-circuit of the first series of turns may result, and this must be counterbalanced by increasing the number of turns.

However, if one wishes to avoid this problem, an insulating sleeve may be made from two complementary parts that can fit into each other around the median portions 23, 24 of the stator parts. Their positioning, easily achieved, prevents the shore-circuiting of the first turns. The sleeves may potentially support the winding connectors.

The length of the windings 3, 4 is limited at the openings of the stator parts 1, 2, which correspond to the distance between the inner edges 35, 36 or 37, 38 of a single stator part 1 or 2, respectively.

The second stator part 5 is coaxial to the rotor 6. It is likewise made from a soft sintered material or by a stack of cut-out plates. The laminated stator is advantageous when high rotational speeds (e.g., 200 pulses per second in pulsed operation, i.e., 10 revolutions per second and a 50 Hz current in the windings) and a substantial energy-conversion output are desired. Another solution consists in producing sintered stators made of iron-nickel or iron-silicon instead of pure iron, so as to take advantage of the highest resistivity of these materials.

In the example described, the second stator part 5 is stationary and the axis of rotation of the rotor passes through it. This second part incorporates four polar zones 39 to 42 corresponding to the stator poles 25 to 28, respectively. The magnetic flux recloses over the polar areas, which coincide with each other as they extend through the solid parts 43 and 44 connecting the polar area 39 to the polar area 40, and the polar area 41 to the polar area 42, respectively. The shape of this second stator part 5 may vary within broad limits. A solid part, separate crescent-shaped parts, or a tubular part can be used. Nevertheless, it is preferable to reduce the cross-sections of flow of the leakage flux between the teeth 39 and 41, on the one hand, and 40 and 42, on the other, as indicated in FIG. 1.

FIG. 2 represents a cross-section view along the lines BCDE of the motor, illustrated in FIG. 1. The various parts making up the motor according to the invention may be integrated into any existing mechanism or device, and may be delivered without any housing.

The rotor 6 comprises a ring-shaped magnet, whose magnetized parts 8 and 13 are shown in FIG. 2. The axis 18 of the rotor 6 supports a sleeve 55 made of a non-magnetic material, e.g., of a plastic material. The magnet is bonded to this sleeve 55, which supports it and joins it to the axis 18. Bearings 53, 53' ensure the positioning of the axis 18 in relation to the stationary inner stator structure 5.

The various components of the motor are fastened to a plate 63 made, for example, of a plastic material. This plate 63 may be formed from an element of the device to be motorized. It has a recess 64 used to hold in place the inner stator part 5 and studs 65 used to attach the two stator parts 1 and 2.

The invention has been described in the foregoing description as a non-limiting example. It is understood that the specialist will be able to make numerous variants while remaining within the protected scope of the invention. In particular, the rotor may be formed from a magnetized disk, the four stator poles of the first stator part and the four stator poles of the second stator part being, in this case, arranged in two planes perpendicular to the axis of rotation.

We claim:

1. Two-phase pulsed or synchronous motor of the type comprising:

a first stator part working in conjunction with two electric coils;

a second stator part ensuring that magnetic fluxes are closed off; and a rotor incorporating 10 thin magnets magnetized transversely in alternating directions so as to present, on each of its surfaces, magnetic poles that are positive and negative in alternating fashion, wherein said rotor comprises five pairs of poles and the first stator part is formed from two identical stator elements made of a magnetically soft material, each of which has two stator poles connected by a median part enclosed by a coil whose length substantially equals a width of the opening of the stator part, said stator poles for each said stator part intersect at an angle of approximately 108°, forming an angular gap therebetween, the second stator part being made of a magnetically soft material which seals off magnetic flow.

2. Two-phase pulsed or synchronous motor according to claim 1, wherein the rotor comprising a ring-shaped magnet magnetized radially and incorporating ten adjacent tile-shaped magnetized areas.

3. Two-phase pulsed or synchronous motor according to claim 1, wherein the second stator part is attached to the rotor.

4. Two-phase pulsed or synchronous motor according to claim 1, wherein said second stator part is stationary and incorporates four areas corresponding, respectively, to the four stator poles, said four areas being connected in pairs so as to ensure that the magnetic fluxes of each of the stator parts will be closed off.

5. Two-phase pulsed or synchronous motor according to claim 1, wherein the angled aperture of the median lines of the two poles of each of the stator parts is slightly greater than 108°.

6. Two-phase pulsed or synchronous motor according to one of claims 1 to 5, wherein the first and second stator parts are formed from a stack of cut-out magnetic plates.

7. Two-phase pulsed or synchronous motor according to one of claims 1 to 5, wherein the first and second stator parts are made from a soft, sintered magnetic material.

8. Two-phase pulsed or synchronous motor according to one of claims 1 to 5, wherein the windings are made of an electric wire wound directly on the median part of the first and second stator parts.

9. Two-phase pulsed or synchronous motor according to claims 1 to 5, wherein the windings are wound on insulating frames which surround the median part of each of the first and second stator parts, said frames being made of several complementary parts forming an insulating sleeve when assembled.

10. Two-phase pulsed or synchronous motor according to claims 1 to 5, wherein the rotor comprises a tubular sleeve coaxial to the axis of rotation and fitted with linkage areas connecting with said axis of rotation, said tubular sleeve supporting the tubular magnet over at least one portion of its height.

11. A two-phase motor comprising:

a first stator element including first and second stator parts situated about a central axis, each said stator part having a pair of stator poles connected through a median part and a winding wound around each said median part;

wherein, each said pair of stator poles are formed of two poles offset by approximately 108° about said central axis;

wherein, said first and second stator parts each have an axis of symmetry offset by approximately 162° about said central axis;

a rotor coaxial with said first stator element and including a ring of 10 alternating poles, each spanning approximately 36° about said central axis; and a second stator element arranged within the ring of the rotor and having a pole aligned with each said stator pole for closing a magnetic flux of a corresponding stator pole.

* * * * *